Figure 4:
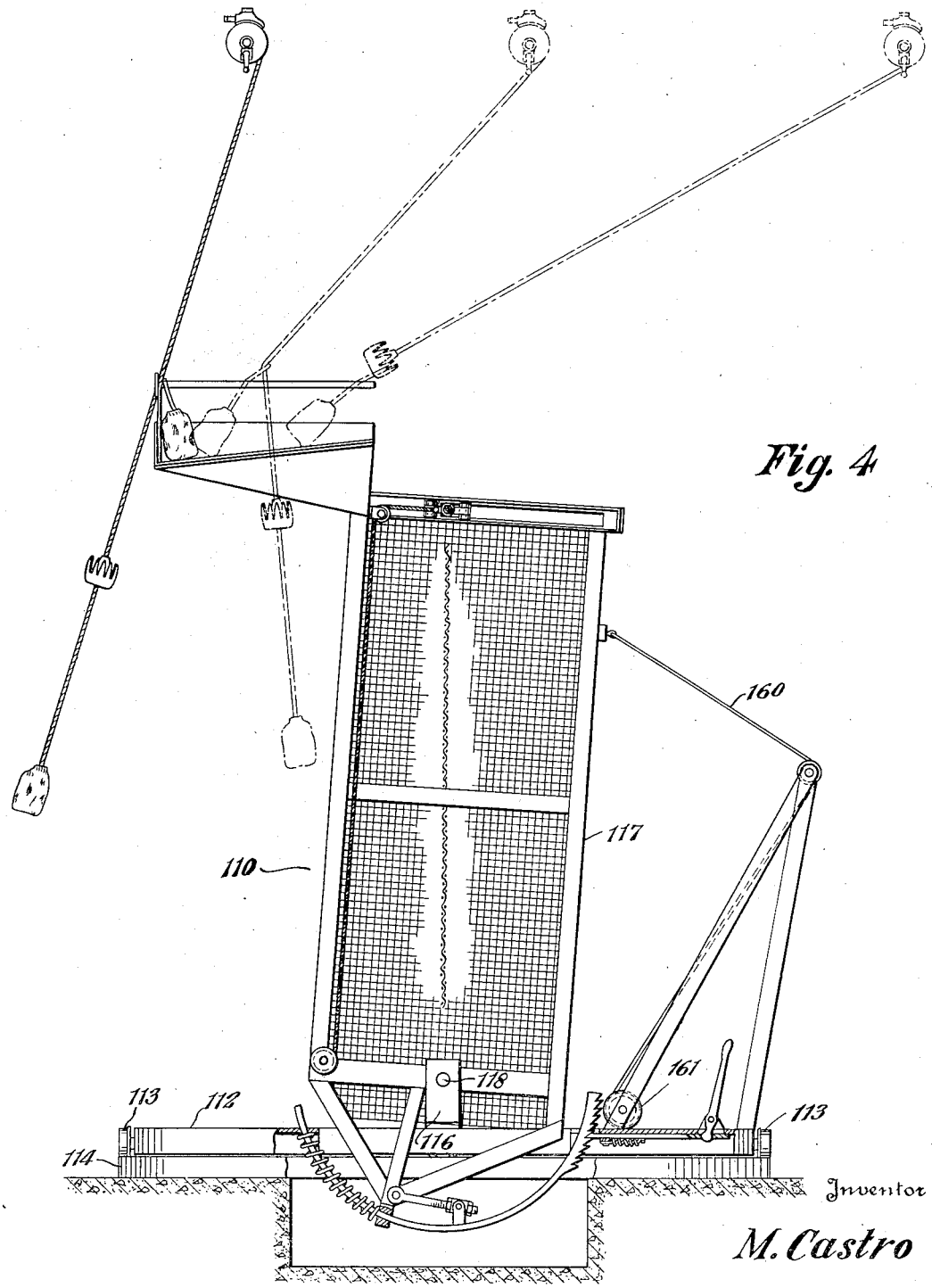

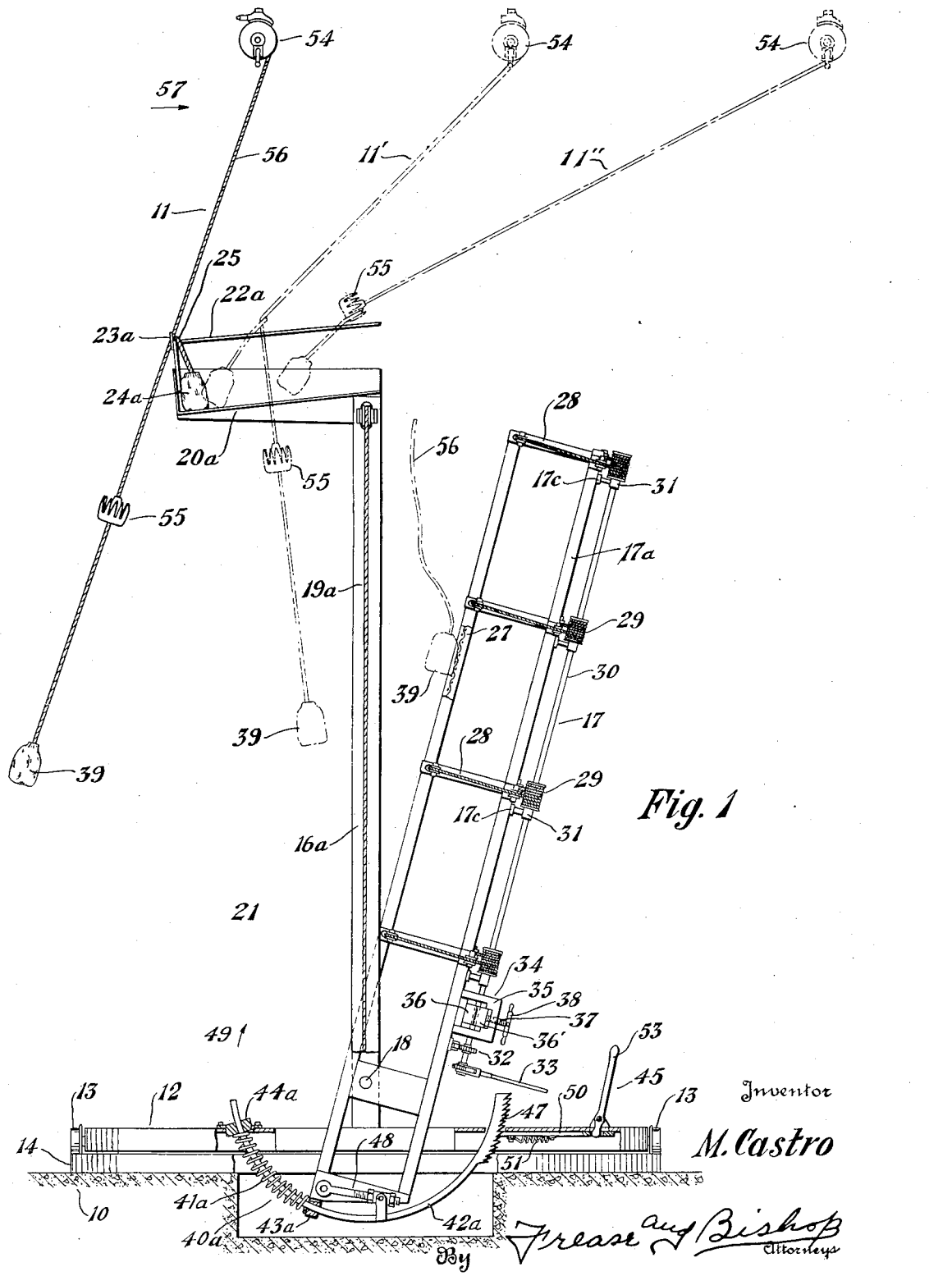

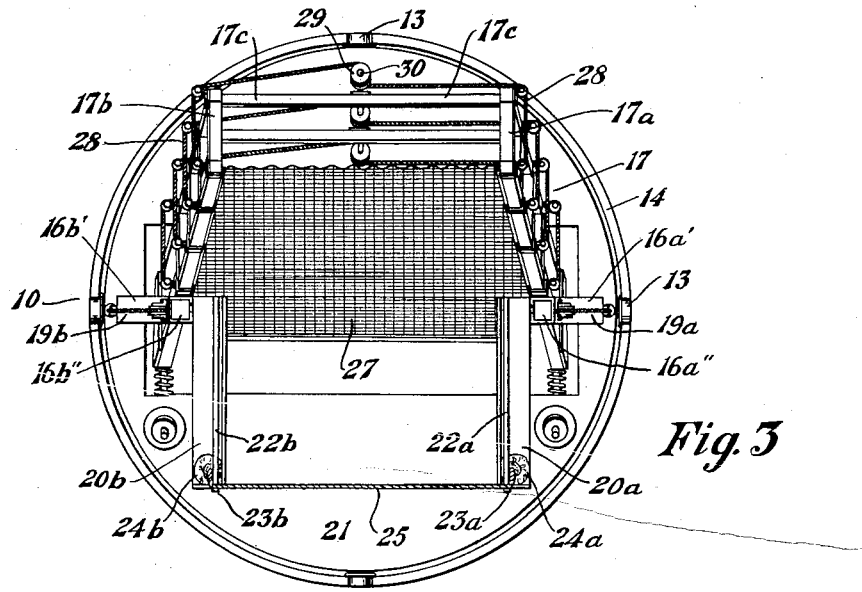
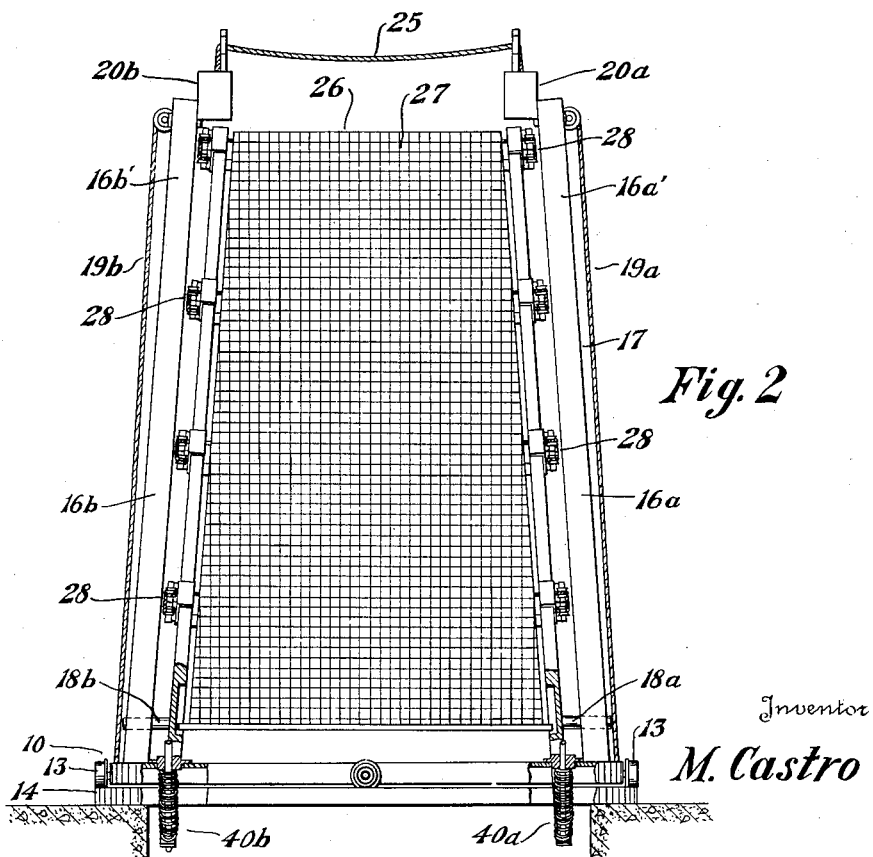

Jan. 16, 1934.   M. CASTRO   1,944,000
CARGO HANDLING APPARATUS FOR AIRCRAFT AND THE LIKE
Filed June 16, 1930   3 Sheets-Sheet 3

Inventor
M. Castro
By Frease and Bishop
Attorneys

Patented Jan. 16, 1934

1,944,000

UNITED STATES PATENT OFFICE 1,944,000

CARGO HANDLING APPARATUS FOR AIRCRAFT AND THE LIKE

Manuel Castro, Canton, Ohio

Application June 16, 1930. Serial No. 461,409

14 Claims. (Cl. 258—1)

My invention relates to apparatus for picking up and discharging cargo from aircraft in flight, and includes improvements in the apparatus set forth in my prior application for Letters Patent of the United States for Cargo handling apparatus for aircraft and the like, Serial No. 309,881, filed October 2, 1928.

Such apparatus necessarily includes elements operatively mounted on the ground or on a ground structure, or on a ship, hereinafter termed the ground elements, for positioning the cargo to be picked up and for receiving the cargo to be discharged, and also includes elements operatively mounted on the aircraft, hereinafter termed the aircraft elements, for cooperating with the ground elements in picking up and discharging cargo.

The present improvements relate more particularly to the ground elements, and are directed towards improving their structure, operation, and cooperation with the aircraft elements.

A fundamental requirement for the successful operation of such apparatus, is to impart to the cargo to be picked up from rest, the required acceleration so that it will attain the velocity or flying speed of the aircraft without reducing the flying speed of the aircraft to any considerable extent.

For example it is estimated that for an aircraft of 2,000 pounds gross load (total weight lifted), and with sufficient excess power to climb 300 ft./min., there is available sufficient excess thrust to provide a force of approximately 97.5 lbs. at 70 M. P. H. flying speed, for use in imparting to the cargo being picked up from rest the necessary acceleration so that it will attain the desired velocity.

Under these circumstances the distance required to be covered by the cargo from the instant it is connected with the pick up means until it attains the speed of the aircraft is as follows:

For 50 lbs. cargo, distance_____ 84.3 ft.
For 40 lbs. cargo, distance_____ 67.5 ft.
For 30 lbs. cargo, distance_____ 50.6 ft.
For 20 lbs. cargo, distance_____ 33.7 ft.
For 10 lbs. cargo, distance_____ 16.9 ft.

In other words, it is necessary for the successful operation of such apparatus that the pick up means be secured to a cable which is permitted an extension of 84.3, 67.5, 50.6, 33.7, or 16.9 feet according to the load to be picked up, as aforesaid.

The improved ground elements of the present invention are preferably used in combination with aircraft elements including automatic cargo pick up and discharge means, a cable at the lower end of which the cargo pick up and discharge means are secured, and yielding means mounted in the aircraft, preferably a yielding reel to which the upper end of the cable is connected for permitting the required extension of the cable for imparting the aforesaid acceleration to the cargo being picked up from rest.

The objects of the present invention include the provision of improved ground elements including yielding moving parts for cooperating with such aircraft elements and the like; whereby the operation of the ground elements during picking up and discharging of cargo is improved; whereby the ground elements are yieldingly and adjustably maintained in the proper position for picking up and discharging cargo, after positioning thereof by a ground crew; and whereby some of the moving parts of the ground elements are automatically and releasably latched in their extreme position of displacement after being moved during a cargo picking up and/or discharging operation.

The foregoing and other objects are attained by the apparatus, parts, improvements and combinations, which comprise the present invention, and which are particularly and distinctly pointed out and set forth in the appended claims forming part hereof.

In general terms, the improved ground elements for cargo handling apparatus for aircraft and the like, include a base, a frame extending upwardly from the base and mounted for movement thereon, means for positioning cargo to be picked up, and means on the frame for receiving discharged cargo, means for yieldingly resisting movement of the frame, means for releasably latching the frame in its position of extreme displacement during operation thereof for picking up and/or discharging cargo, and improvements in the details of construction and arrangement of the cargo receiving means.

Preferred embodiments of the invention are illustrated in the accompanying drawings forming part hereof, in which Figure 1 is a fragmentary side elevation of one set of ground elements for cargo handling apparatus for aircraft and the like, including one embodiment of the present improvements, cooperation thereof with the preferred aircraft elements being illustrated diagrammatically;

Fig. 2, a fragmentary front elevation thereof;

Fig. 3, a top plan view thereof; and

Fig. 4, a fragmentary side elevation of another set of ground elements for cargo handling apparatus for aircraft and the like, including another embodiment of the present improvements, cooperation thereof with the preferred aircraft elements being illustrated diagrammatically.

Similar numerals refer to similar parts throughout the drawings.

In Figs. 1 to 3 inclusive, ground elements for cargo handling apparatus for aircraft and the like comprising one embodiment of the present improvements, are indicated generally at 10, and are adapted for cooperation with aircraft elements indicated diagrammatically at 11.

The ground elements 10 preferably include a base 12, which is preferably carried on wheels 13 whose axes of rotation are in a horizontal plane and radiate from a common center, and the wheels 13 preferably roll on a circular track 14 mounted on a suitable foundation on the ground, or on a ground structure, or on a ship, whereby the base 12 and the parts mounted thereon may be rotated about a vertical axis for placing the ground elements in the proper position with respect to the wind and the aircraft from which cargo is to be handled.

The base 12 is preferably circular as illustrated, and preferably at equal distances from and on opposite sides of the vertical axis of rotation, laterally spaced telescopic masts 16a and 16b are mounted on and extend upwardly from the base 12.

A frame 17 upon which cargo is discharged is rotatably mounted intermediate its ends between the telescopic masts 16a and 16b on horizontal alined pivots 18a and 18b, which are journalled respectively in the masts 16a and 16b, and the lower end of the frame 17 extends below the base.

The telescopic mast 16a includes a tubular member 16a' secured at its lower end to the base 12, and an extensible member 16a" is slidably mounted in the tubular member 16a'.

Similarly the telescopic mast 16b includes a tubular member 16b' secured at its lower end to the base 12, and an extensible member 16b" is slidably mounted in the tubular member 16b'.

Means are provided for raising and lowering to any desired elevations the extensible members 16a" and 16b" of the masts 16a and 16b, and may include a cable and pulley hoist indicated generally at 19a for the mast 16a, and a cable and pulley hoist indicated generally at 19b for the masts 16b.

At the inside of the upper end of the extensible mast member 16a", a cargo positioning platform 20a is mounted, and similarly at the inside of the upper end of the extensible mast member 16b", a cargo positioning platform 20b is mounted.

The platforms 20a and 20b preferably extend longitudinally and are located on the on-side 21 of the frame 17.

A preferably upwardly and longitudinally extending guide bar 22a is secured at one end to a strut 23a extending upwardly from the extreme on-side end of the platform 20a, and the guide bar 22a extends from the strut 23a at the inside of the platform towards the frame 17; and a similar upwardly and longitudinally extending guide bar 22b is secured at one end to a strut 23b extending upwardly from the extreme on-side end of the platform 20b, and the guide bar 22b extends from the strut 23b at the inside of the platform towards the frame 17.

The guide bars 22a and 22b are preferably made of flexible material such as spring steel.

The cargo to be picked up is preferably carried in bags 24a and 24b supported on the platforms 20a and 20b and connected respectively with each other by a cable 25, whose ends are connected to the bags 24a and 24b, and which lays over the upper sides of the guide bars 22a and 22b and and extends laterally in front of and spaced from the on-side of the frame 17.

The frame 17 includes side panels 17a and 17b on which the pivots 18a and 18b are secured respectively, and the side panels extend upwardly and downwardly from the pivots and slope towards each other above the pivots, as illustrated.

The frame 17 also preferably includes a plurality of braces 17c extending between and being secured at their ends to the side frames.

Yielding cargo receiving means indicated generally at 26 are mounted on the frame 17, and preferably comprise a flexible sheet member 27 which may be metallic fabric as illustrated, and which is stretched between the frame side panels, as by means of a plurality of cables each indicated generally by 28.

The ends of each cable are secured to opposite sides of the sheet member 27, and each cable is secured at its center to a reel 29, and the opposite half of each cable 28 is reversely wound around its reel 29, whereby rotation of each reel applies any desired tension to the flexible sheet member 27.

Common means are provided for simultaneously rotating all of the reels, and may include a shaft 30 extending through suitable bores in and being secured to each reel.

The shaft 30 may be journalled in bearing blocks 31 secured on the cross braces 17c, and may be provided at one end with releasable ratchet means 32 for preventing unwinding of the reels when the desired tension is being applied to the flexible sheet member 27.

A ratchet lever 33 may be provided for rotating the shaft 30, and after a desired initial tension has been applied to the flexible sheet member 27 the ratchet 32 may be released, and a predetermined resistance against turning of the shaft 30 may be provided as by means of a screw friction brake indicated generally by 34, and including a brake frame 35 mounted upon the frame 17, a stationary brake block 36 mounted between the shaft 30 and the frame 17, and a movable brake block 36' movable in the brake frame 34 towards and away from the shaft 30.

A screw 37 is rotatable in a threaded aperture formed in the brake frame 35, and a hand wheel 38 is mounted at the outer end of the screw 37, while the inner end of the screw engages with the movable brake block 36', whereby rotation of the screw 37 applies any desired frictional force between the brake blocks and the shaft 30.

Consequently the impact of a discharged cargo bag 39 against the flexible sheet 27 may cause the cables 28 to unwind if the velocity of the moving discharged cargo bag 39 is sufficiently great.

Adjustable yielding means indicated generally by 40a and 40b are preferably provided respectively at the lower ends of each of the side panels 17a and 17b, for resisting rotary rocking movement of the frame 17.

The rocking resisting means 40a and 40b are similar in construction, and the means 40a will be described in detail, and includes a compression spring 41a interposed between the base 12 and the on-side of the panel 17a below its pivot 18a.

The compression spring 41a is provided with guide means which preferably includes an arcuate guide bar 42a which is movable in an arcuate aperture of a bearing block 43a secured at the lower end of the panel 17a.

The arcuate guide bar 42a also extends through an arcuate aperture formed in a guide and stop block 44a secured to the base 12 at the on-side 21 of the frame 17.

Releasable latch means indicated generally by 45 are provided preferably at the off-side 46 of the frame 17, for positioning the frame 17 at any desired angle with respect to the base, preferably in cooperation with the spring 41a.

The latch means 45 preferably include ratchet teeth 47 formed in the outer periphery of the off-side end of the arcuate guide bar 42a, and the latch teeth 47 are cut to permit rotary movement of the guide bar 42a and the frame 17a which is adjustably secured to the guide bar 42a as by means of a screw linkage indicated by 48, in the direction of the arrow 49, a latch tooth 50 being operatively mounted on the base 12 and maintained in yielding engagement with one of the ratchet teeth 47 as by means of a spring 51.

A control lever 53 is provided for permitting withdrawal of the latch tooth 50 from engagement with the ratchet teeth 47. The frame 17 is initially positioned by manipulation of the screw linkage 48, with the latch tooth 50 in spring engagement with one of the ratchet teeth 47.

When a discharged cargo bag 39 strikes the flexible sheet member 27 carried on the frame 17, the sheet member 27 will yield as aforesaid, and if the velocity of the bag is sufficiently great, the entire frame will rotate in the direction of the arrow 49 to an extreme position of movement, where it will be releasably held by the latch tooth 50 engaging with one of the ratchet teeth 47.

The spring 41a will thus be loaded, and when the latch tooth 51 is withdrawn from the ratchet teeth 47, the spring 41a will return the frame 17 to the desired normal position for receiving cargo.

Accordingly the energy of the discharged cargo 39 is absorbed in part by the yielding sheet impact member 27, and in part by movement of the frame 17.

The aircraft elements indicated diagrammatically at 11 are similar to those set forth in my prior application for Letters Patent of the United States for Cargo handling apparatus for aircraft and the like, Serial No. 309,881, filed October 2, 1928, and include a reel 54 suitably mounted in an aircraft fuselage not shown and a combined pick up and discharging means 55 connected with the reel 54 by means of a cable 56.

The reel 54 includes means applying a suitable yielding unwinding reaction so that the necessary acceleration may be imparted to the cargo being picked up by the pick up means 55.

The pick up means 55 is automatically actuated by impact either with the cable 25 connecting the cargo bags 24a and 24b, or against the flexible sheet 27, when cargo is not being picked up.

The aircraft elements are illustrated in full lines in Fig. 1 just as the cable 56 strikes the cable 25 when moving in the horizontal direction of the arrow 57.

The aircraft elements are illustrated in dot-dash lines at 11' illustrating an intermediate position of the cable 56 as its lower end whips about the cable 25 before the cargo bag 39 has been released.

At 11'' the aircraft elements are illustrated in dot-dash lines after the cable 25 and attached cargo bags 24a and 24b have been picked up and engaged by the pick up and discharge means 55 and just as the discharged cargo bag 39 is striking the flexible sheet 27.

The operation of the apparatus after the discharged cargo bag 29 strikes the flexible sheet 27 has been described as aforesaid.

The improved ground elements indicated generally at 110 in Fig. 4 illustrate the present improvements applied to ground elements otherwise of the type set forth in my companion application for United States Letters Patent for Cargo handling apparatus for aircraft and the like, filed June 13, 1930, Serial No. 460,945, and which has issued as United States Letters Patent No. 1,871,495 on August 16, 1932.

The improved ground elements 110 preferably include a base 112, which is preferably carried on wheels 113 whose axes of rotation are in a horizontal plane and radiate from a common center, and the wheels 113 preferably roll on a circular track 114 mounted on a suitable foundation on the ground, or on a ground structure, or on a ship, whereby the base 112 and the parts mounted thereon may be rotated about a vertical axis for placing the ground elements in the proper position with respect to the wind and the aircraft from which cargo is to be handled.

The base 112 is preferably circular as illustrated, and preferably at equal distances from and on opposite sides of the vertical axis of rotation, laterally spaced posts 116 are mounted on and extend upwardly from the base 112.

A frame 117 upon which cargo is discharged is rotatably mounted between the posts 116 on horizontal alined pivots 118, which are journalled in the posts 116.

The frame 117 is otherwise similar to the frame of my said Patent No. 1,871,495.

A cable 160 is connected at its upper end with the upper end of the frame 117 and at its lower end with a retrieving drum 161 mounted on the base 112, whereby counterclockwise movement of the frame 117 may be yieldingly controlled.

The frame 117 is otherwise mounted on the base 112 in the same manner as the frame 17 is mounted on the base 12 in the apparatus 10.

I claim:

1. Ground elements for cargo handling apparatus for aircraft and the like including a base, a frame extending upwardly from the base and mounted for movement thereon about a horizontally extending axis, means on the frame for receiving discharged cargo, the cargo receiving means including a flexible sheet member, and yielding means connecting the sheet member with the frame.

2. Ground elements for cargo handling apparatus for aircraft and the like including a base, a frame extending upwardly from the base and mounted adjacent its lower end for movement on the base about a horizontally extending axis, means on the frame for receiving discharged cargo, and resilient means normally maintaining the frame in a predetermined position yieldingly resisting movement of the frame, said resilient means engaging the lower end of the frame below the axis.

3. Ground elements for cargo handling apparatus for aircraft and the like including a base, a frame extending upwardly from the base and mounted adjacent its lower end for movement on the base about a horizontally extending axis, resilient means on the frame for receiving discharged cargo, and resilient means normally maintaining the frame in a predetermined position and yieldingly resisting movement of the frame.

4. Ground elements for cargo handling apparatus for aircraft and the like including a base, a frame extending upwardly from the base, and the frame being mounted adjacent its lower end for movement on the base about a horizontally extending axis, means on the frame for receiving discharged cargo, and resilient means below the axis and coacting between the base and the lower end of the frame for yieldingly resisting movement of the frame.

5. Ground elements for cargo handling apparatus for aircraft and the like including a base, a frame extending upwardly from the base and mounted intermediate its ends for rotary movement on the base, means on the frame for receiving discharged cargo, and means coacting with the lower end of the frame for holding the frame after rotary movement thereof on the base.

6. Ground elements for cargo handling apparatus for aircraft and the like including a base, a frame extending upwardly from the base and mounted intermediate its ends for rotary movement on the base, means on the frame for receiving discharged cargo, means for yieldingly resisting movement of the frame, and means coacting with the lower end of the frame for holding the frame after rotary movement thereof on the base.

7. Ground elements for cargo handling apparatus for aircraft and the like including a base, a frame extending upwardly from the base and mounted intermediate its ends for rotary movement on the base, resilient means on the frame for receiving discharged cargo, and means coacting with the lower end of the frame for holding the frame after rotary movement thereof on the base.

8. Ground elements for cargo handling apparatus for aircraft and the like including a base, a frame extending upwardly from the base and mounted intermediate its ends for rotary movement on the base, resilient means on the frame for receiving discharged cargo, means for yieldingly resisting movement of the frame, and means coacting with the lower end of the frame for holding the frame after rotary movement thereof on the base.

9. Ground elements for cargo handling apparatus for aircraft and the like including a base, a frame extending upwardly from the base, and the frame being mounted adjacent its lower end for movement on the base about a horizontal axis, means on the frame for receiving discharged cargo, and means coacting with the lower end of the frame below the axis for holding the frame after movement thereof on the base.

10. Ground elements for cargo handling apparatus for aircraft and the like including a base, a frame extending upwardly from the base, and the frame being mounted adjacent its lower end for movement on the base about a horizontal axis, means on the frame for receiving discharged cargo, means for yieldingly resisting movement of the frame, and means coacting with the lower end of the frame below the axis for holding the frame after movement thereof on the base.

11. Ground elements for cargo handling apparatus for aircraft and the like including a base, a frame extending upwardly from the base and mounted intermediate its ends for movement on the base about a horizontal axis, means on the frame for receiving discharged cargo, the lower end of the frame extending below the base, and resilient means interposed between the base and the lower end of the frame for resisting movement of the frame.

12. Ground elements for cargo handling apparatus for aircraft and the like including a base, a frame extending upwardly from the base and mounted intermediate its ends for movement on the base about a horizontal axis, resilient means on the frame for receiving discharged cargo, the lower end of the frame extending below the base, and resilient means interposed between the base and the lower end of the frame for resisting movement of the frame.

13. Ground elements for cargo handling apparatus for aircraft and the like including a base, a frame extending upwardly from the base and mounted intermediate its ends for movement on the base about a horizontal axis, the lower end of the frame extending below the base, and means on the base coacting with the lower end of the frame for holding the frame after movement thereof on the base.

14. Ground elements for cargo handling apparatus for aircraft and the like including a base, a frame extending upwardly from the base and mounted intermediate its ends for movement on the base about a horizontal axis, resilient means on the frame for receiving discharged cargo, the lower end of the frame extending below the base, and means on the base coacting with the lower end of the frame for holding the frame after movement thereof on the base.

MANUEL CASTRO.